(12) United States Patent
Wu et al.

(10) Patent No.: US 11,630,272 B2
(45) Date of Patent: Apr. 18, 2023

(54) PHOTOELECTRIC SIGNAL CONVERSION AND TRANSMISSION DEVICE

(71) Applicant: NIEN-YI INDUSTRIAL CORP., Taipei (TW)

(72) Inventors: Wen-Cheng Wu, Taipei (TW); Jing-Qing Chan, Taipei (TW); Guan-Shiou Chen, Taipei (TW); Zeng-Xin Guo, Taipei (TW)

(73) Assignee: NIEN-YI INDUSTRIAL CORP., Taipei (TW)

( * ) Notice: Subject to any disclaimer, the term of this patent is extended or adjusted under 35 U.S.C. 154(b) by 161 days.

(21) Appl. No.: 17/336,254

(22) Filed: Jun. 1, 2021

(65) Prior Publication Data

US 2022/0382001 A1 Dec. 1, 2022

(51) Int. Cl.
| | | |
|---|---|---|
| *G02B 6/42* | (2006.01) | |
| *G02B 6/293* | (2006.01) | |
| *H04B 10/40* | (2013.01) | |
| *G02B 6/43* | (2006.01) | |

(52) U.S. Cl.
CPC ........... *G02B 6/4219* (2013.01); *H04B 10/40* (2013.01); *G02B 6/29317* (2013.01); *G02B 6/42* (2013.01); *G02B 6/423* (2013.01); *G02B 6/428* (2013.01); *G02B 6/4243* (2013.01); *G02B 6/4278* (2013.01); *G02B 6/4284* (2013.01); *G02B 6/4292* (2013.01); *G02B 6/43* (2013.01)

(58) Field of Classification Search
CPC .... G02B 6/4219; G02B 6/29317; G02B 6/42; G02B 6/423; G02B 6/4243; G02B 6/4278; G02B 6/428; G02B 6/4284; G02B 6/4292; G02B 6/43; H04B 10/40
See application file for complete search history.

(56) References Cited

U.S. PATENT DOCUMENTS

| | | | | |
|---|---|---|---|---|
| 7,153,037 | B2 * | 12/2006 | Kuhara | G02B 6/4249 385/16 |
| 9,310,574 | B2 * | 4/2016 | Lin | G02B 6/4284 |
| 9,680,573 | B2 * | 6/2017 | Lin | G02B 6/4269 |
| 9,989,719 | B2 * | 6/2018 | Lin | G02B 6/4243 |
| 10,018,791 | B2 * | 7/2018 | Heo | G02B 6/428 |
| 2013/0270427 | A1 * | 10/2013 | Hsiao | G02B 6/4246 250/227.28 |

FOREIGN PATENT DOCUMENTS

WO WO-2016088349 A1 * 6/2016 ............... G02B 6/26

* cited by examiner

*Primary Examiner* — Ryan A Lepisto
*Assistant Examiner* — Erin D Chiem
(74) *Attorney, Agent, or Firm* — Leong C. Lei

(57) ABSTRACT

The photoelectric signal conversion and transmission device includes a photoelectric signal module and a fiber joint, matched and coupled together. A circuit board of the photoelectric signal module includes one or more connection bases. Light emission elements, light reception elements, and amplifiers are configured on a first coupling face of the connection based, and electrically connected by first and second wires. The fiber joint includes a number of fibers axially aligned with the light emission and reception elements. By having the light emission and reception elements and amplifiers configured on a same coupling face, their physical connection distance is reduced, thereby decreasing signal attenuation, enhancing signal transmission performance, and facilitating structural miniaturization.

11 Claims, 5 Drawing Sheets

PHOTOELECTRIC SIGNAL CONVERSION AND TRANSMISSION DEVICE

BACKGROUND OF THE INVENTION (a) Technical Field of the Invention

The present invention is generally related to photoelectric device, and more particular to a photoelectric signal conversion and transmission device.

(b) Description of the Prior Art

ROC Taiwan Patent No. 1521248, U.S. Pat. Nos. 9,680,573 and 9,989,719 (all filed by the present Applicant) teach an optical transceiver includes a connection base disposed on a circuit main board, and between a fiber joint and a circuit sub-board. Photoelectric elements are disposed on a face of the connection base facing the fiber joint. At least an amplifier is disposed on the circuit sub-board and wire-connected to the photoelectric elements. The circuit sub-board in turn is wire-connected to a circuit main board.

The optical transceiver has a number of shortcomings as follows.

Firstly, the optical transceiver's amplifier is located on the circuit main board, and the photoelectric elements are separately located on the connection base. An extended wiring distance between the amplifier and the photoelectric elements may lead to signal attenuation and lower signal quality.

Secondly, the amplifier being located on the main circuit board means that the main circuit board requires additional dimension to accommodate the amplifier, making the optical transceiver's miniaturization more difficult.

SUMMARY OF THE INVENTION

The gist of the present invention lies in that placing light emission or reception elements and amplifier on a same place of the connection base (i.e., a first coupling face of the connection base), and configuring the first coupling face perpendicularly on the circuit board, so that the light emission or reception elements and the amplifier are positioned closer to the circuit board. Additionally, the amplifier is disposed between the circuit board and the light emission or reception elements, thereby effectively reducing the distance between the amplifier and the light emission or reception elements and the circuit board for wiring, lessening signal attenuation, and enhancing signal transmission performance. Furthermore, by disposing the amplifier on the connection base instead on the circuit board, the dimension of the circuit board is effectively reduced, facilitating the miniaturization of the photoelectric signal conversion and transmission device.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
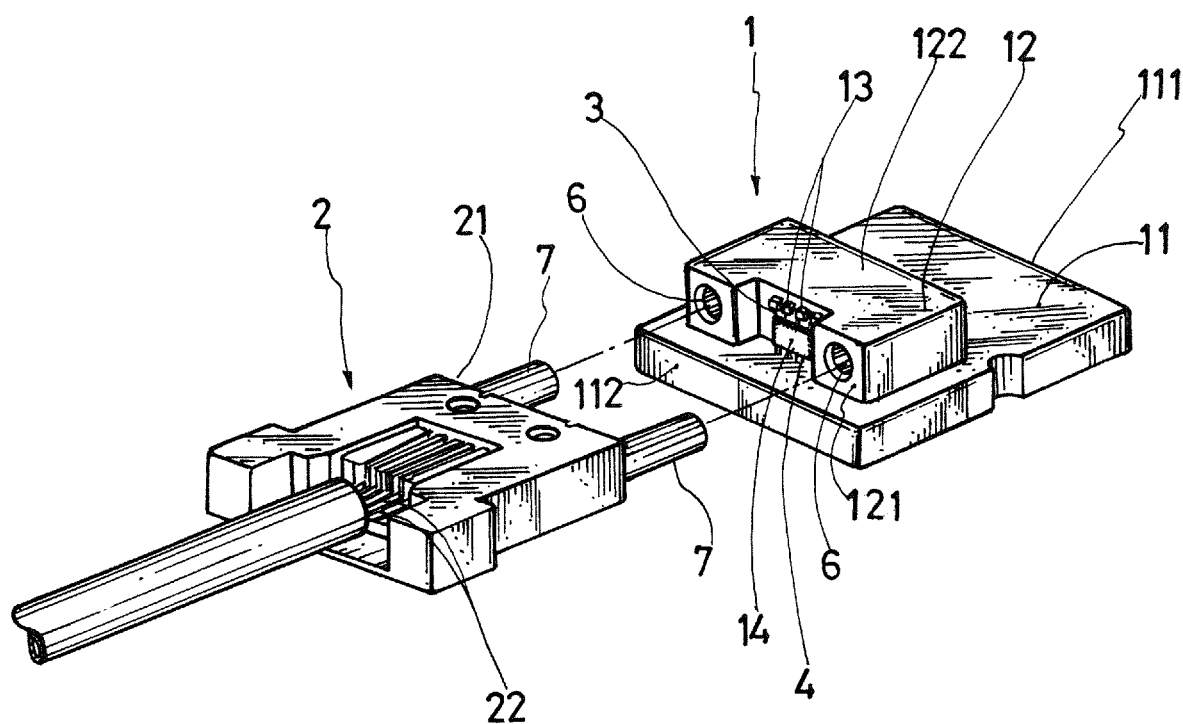
FIG. 1 is a perspective diagram showing a photoelectric signal conversion and transmission device according to a first embodiment of the present invention.

As shown in FIG. 1, a photoelectric signal conversion and transmission device according to a first embodiment of the present invention includes a photoelectric signal module 1 and a fiber joint 2.

The photoelectric signal module 1 includes a circuit board 11, a connection base 12, light emission or reception elements 13, and at least an amplifier 14. The circuit board 11 provides photoelectric signal conversion. The circuit board 11 has a first end 111 and a second end 112 opposite to the first end. A number of signal terminals may be provided on the first end 111 and the second end 112 through metallic printing. The circuit board 11 may be electrically connected to a multimedia device by plugging the signal terminals on the first end 111 to a signal socket of the multimedia device.

The connection base 12 is disposed on the circuit board 11 adjacent to the second end 112. The connection base 12 has a first coupling face 121 and a top face 122. The first coupling face 121 is adjacent to the second end 112 and perpendicular to the circuit board 11. The top face 122 is on a top side of the connection base 12 parallel to the circuit board 11. The first coupling face 121 may have a number electrical contacts at intervals by metallic printing. The connection base 12 may be made of a plastic, ceramic, or a silicon material.

The light emission or reception elements 13 are disposed along the first coupling face 121 of the connection base 12, each electrically connected one of the electrical contacts. Each light emission or reception element 13 may be a Laser Diode (LD), a Light-Emitting Diode (LED), or a photodiode (PD).

The amplifier 14 is disposed on the first coupling face 121 of the connection base 12 adjacent to the circuit board 11 and the light emission or reception elements 13. For example, the amplifier 14 is disposed vertically between the circuit board 11 and the light emission or reception elements 13, and the light emission or reception elements 13 and the amplifier 14 are both located on a same plane of the connection base 12. The amplifier 14 is electrically connected to the circuit board 11 and the light emission or reception elements 13, respectively. For example, the amplifier 14 is electrically connected to a number of first wires 3 and a number of second wires 4. The first wires 3 are for electrical connection with the light emission or reception elements 13. The second wires 4 are for electrical connection with the signal terminals of the circuit board 11. As such, the circuit board 11, the amplifier 14, the light emission or reception elements 13 are electrically connected. The first wires 3 are electrically connected to the electrical contacts of the connection base 12, and to the light emission or reception elements 13. The amplifier 14 may be a driver chip, such as a LD driver chip or a LED driver chip, or a transimpedance amplifier (TIA).

The fiber joint 2 and the photoelectric signal module 1 are matched and coupled together. A second coupling face 21 of the fiber joint 2 faces the first coupling face 121 of the connection base 12. The fiber joint 2 includes a number of fibers 22, each having a front end from which light is emitted or received exposed from the second coupling face 21. The fibers 22 have their front ends axially aligned with the light emission or reception elements 13, respectively.

The connection base 12 has two sockets 6 disposed on the first coupling face 121 respectively on two lateral sides of the light emission or reception elements 13. Correspondingly, the fiber joint 2 has two plugs 7 on the second coupling face 21 respectively on two lateral sides of the fibers 22. When the fiber joint 2 and the photoelectric signal module 1 are coupled, the plugs 7 are plugged into the sockets 6 so that the light emission or reception elements 13 on the first coupling face 121 are axially aligned with the front ends of the fibers 22 on the second coupling face 21.

When the terminals on the first end 111 of the circuit board 11 is electrically connected to the signal socket of the multimedia device, electrical signals from the multimedia device is converted to light signals by the circuit board 11 and the amplifier 14. The light signals are emitted from the light emission elements 13 to the fibers 22 of the fiber joint 2 for transmission. The light reception elements 13 may also receive light signals from the fibers 22 of the fiber joint 2, where the light signals are converted and transmitted to the multimedia device by the amplifier 14 and the circuit board 11.

Therefore, the gist of the present invention lies in that placing the light emission or reception elements 13 and the amplifier 14 on a same place of the connection base 12 (i.e., the connection base 12's first coupling face 121), and configuring the first coupling face 121 perpendicularly on the circuit board 11, so that the light emission or reception elements 13 and the amplifier 14 are positioned closer to the circuit board 11. Additionally, the amplifier 14 is disposed between the circuit board 11 and the light emission or reception elements 13, thereby effectively reducing the distance between the amplifier 14 and the light emission or reception elements 13 and the circuit board 11 for wiring, lessening signal attenuation, and enhancing signal transmission performance. Furthermore, by disposing the amplifier 14 on the connection base 12 instead on the circuit board 11, the dimension of the circuit board 11 is effectively reduced, facilitating the miniaturization of the photoelectric signal conversion and transmission device.

Figure 2:
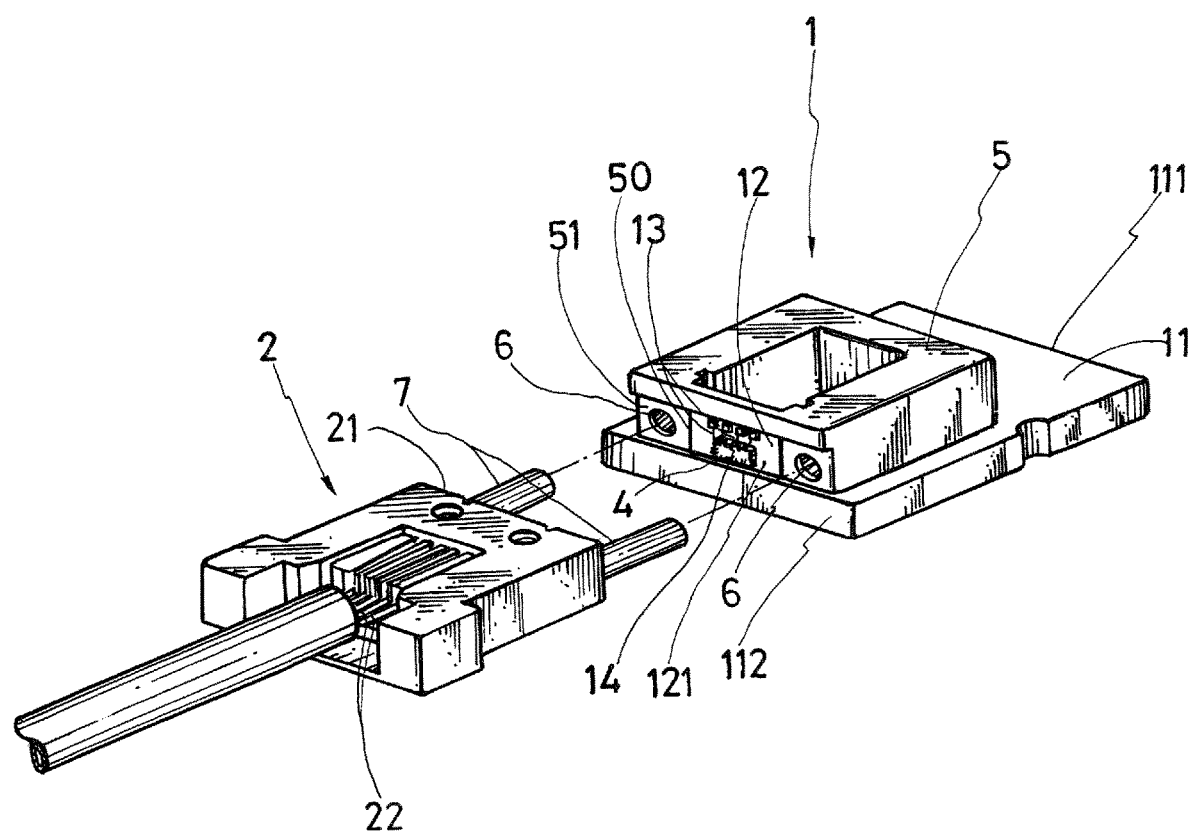
FIG. 2 is a perspective diagram showing a photoelectric signal conversion and transmission device according to a second embodiment of the present invention.

As shown in FIG. 2, a photoelectric signal conversion and transmission device according to a second embodiment of the present invention includes a photoelectric signal module 1, a fiber joint 2, and a positioning base 5. The photoelectric signal module 1 and the fiber joint 2 are generally identical to those of the first embodiment. The positioning base 5 is disposed on the circuit board 11 adjacent to the second end 112. The positioning base 5 has a third coupling face 51 adjacent to the second end 112 and parallel to the first coupling face 121. The third coupling face 51 has an opening 50, and the connection base 12 is configured on the circuit board 11 and embedded in the positioning base 5 through the opening 50 so that the connection base 12 and positioning base 5 are integrated together. The positioning base 5 has two sockets 6 disposed on the third coupling face 51 respectively on two lateral sides of the connection base 12. Correspondingly, the fiber joint 2 has two plugs 7 on the second coupling face 21 respectively on two lateral sides of the fibers 22. When the fiber joint 2 and the photoelectric signal module 1 are coupled, the plugs 7 are plugged into the sockets 6 so that the light emission or reception elements 13 on the first coupling face 121 are axially aligned with the front ends of the fibers 22 on the second coupling face 21.

Figure 3:
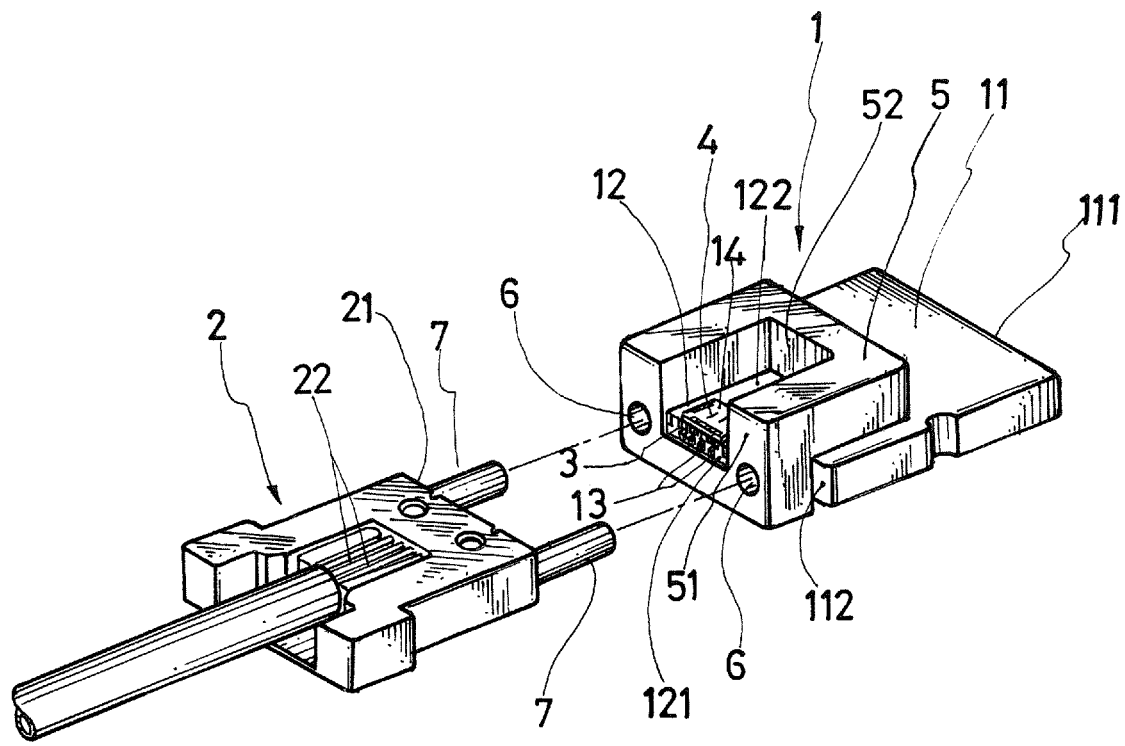
FIG. 3 is a perspective diagram showing a photoelectric signal conversion and transmission device according to a third embodiment of the present invention.

As shown in FIG. 3, a photoelectric signal conversion and transmission device according to a third embodiment of the present invention includes a photoelectric signal module 1, a fiber joint 2, and a positioning base 5. The photoelectric signal module 1, fiber joint 2 are generally identical to those of the first embodiment. The positioning base 5 is disposed on the circuit board 11 adjacent to the second end 112. The positioning base 5 has a third coupling face 51 adjacent to the second end 112 and parallel to the first coupling face 121. The positioning base 5 has a recess 52 extended backward from the third coupling face 51 towards the first end 111 of the circuit board 11. The positioning base 5's third coupling face 51 and recess 52 are extended forward out of the circuit board 11's second end 112. The connection base 12 is disposed in the positioning base 5's recess 52. The light emission or reception elements 13 are also configured on the connection base 12's first coupling face 121, and the amplifier 14 is disposed on the connection base 12's top face 122. As such, the amplifier 14 is also positioned between the circuit board 11 and the light emission or reception elements 13. Multiple first wires 3 may be applied to electrically connect the light emission or reception elements 13 after a 90-degree turn. Multiple second wires 4 are applied to electrically connect the circuit board 11's terminals. As such, the circuit board 11, the amplifier 14, and the light emission or reception elements 13 are electrically connected together. The positioning base 5 has two sockets 6 disposed on the third coupling face 51 respectively on two lateral sides of the recess 52. Correspondingly, the fiber joint 2 has two plugs 7 on the second coupling face 21 respectively on two lateral sides of the fibers 22. When the fiber joint 2 and the photoelectric signal module 1 are coupled, the plugs 7 are plugged into the sockets 6 so that the light emission or reception elements 13 on the first coupling face 121 are axially aligned with the front ends of the fibers 22 on the second coupling face 21.

Figure 4:
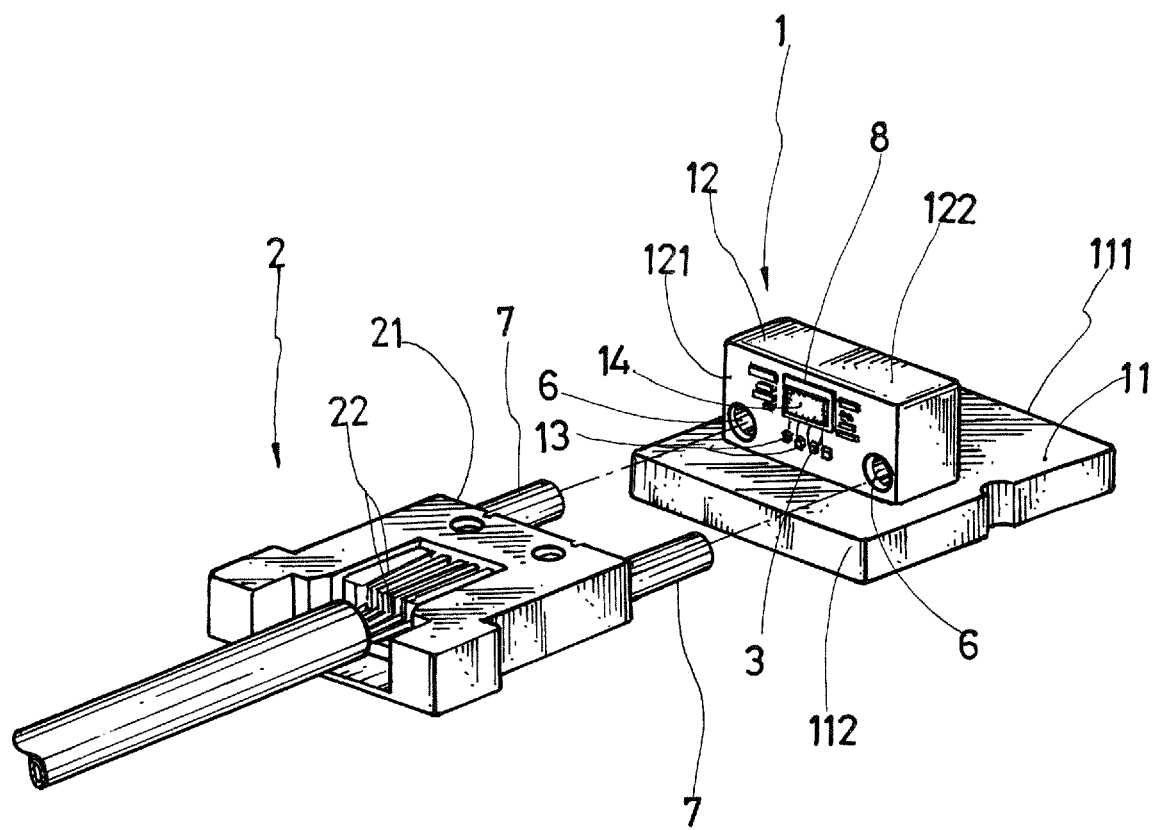
FIG. 4 is a perspective diagram showing a photoelectric signal conversion and transmission device according to a fourth embodiment of the present invention.
Figure 5:
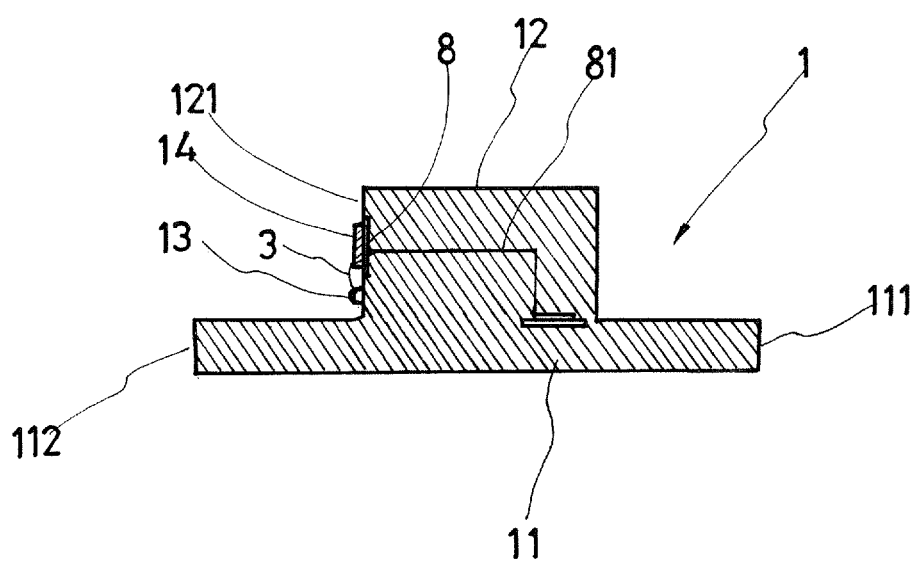
FIG. 5 is a schematic profile diagram showing the photoelectric signal conversion and transmission device of FIG. 4.

As shown in FIGS. 4 and 5, a photoelectric signal conversion and transmission device according to a fourth embodiment of the present invention includes a photoelectric signal module 1 and a fiber joint 2. The photoelectric signal module 1 and the fiber joint 2 are generally identical to those of the first embodiment. In the present embodiment, the connection base 12 and the circuit board 11 are integrally formed by, for example, 3D printing. On the connection base 12's first coupling face 121, there is at least a connector element 8. A number of transmission paths 81 are sealed inside the connection base 12 and extended from the connector element 8. The transmission paths 81 establish electrical connection with the circuit board 11 so that the amplifier 14 electrically connected to the connector element 8 is also electrically connected to the circuit board 11. The amplifier 14 is then electrically connected to the light emission or reception elements 13 through first wires 3. Alternatively, the light emission or reception elements 13 may be electrically connected to connector element 8 first via first wires 3 and then to the amplifier 14.

As described above, the gist of the present invention lies in that light emission or reception elements 13 and at least an amplifier 14 are configured together on the connection base 12 and the connection base 12 is in turn configured on the circuit board 11. Therefore, the light emission or reception elements 13 and the amplifier 14 are closer to the circuit board 11. Further by placing the amplifier 14 between the circuit board 11 and the light emission or reception elements 13, the wiring distance between the amplifier 14 and light emission or reception elements 13 and circuit board 11 is effectively reduced, lessening signal attenuation and enhancing signal transmission performance.

The photoelectric signal conversion and transmission device includes a photoelectric signal module and a fiber joint, matched and coupled together. A circuit board of the photoelectric signal module includes one or more transfer boards. Light emission elements, light reception elements, and amplifiers are configured on a first coupling face of the transfer boards, and electrically connected by first and second trances. The fiber joint includes a number of fibers axially aligned with the light emission and reception elements. By having the light emission and reception elements and amplifiers configured on a same coupling face, their physical connection distance is reduced, thereby decreasing signal attenuation, enhancing signal transmission performance, and facilitating structural miniaturization.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A photoelectric signal conversion and transmission device, comprising:
    a photoelectric signal module comprising;
        a circuit board having a first end and a second end opposite to the first end, where the first end is for electrical connection to an external multimedia device,
        a connection base disposed on the circuit board adjacent to the second end, where the connection base has a first coupling face adjacent to the second end;
        a plurality of light emission or reception elements disposed on the first coupling face of the connection base,
        an amplifier disposed on the first coupling face of the connection base adjacent to the circuit board, where the light emission or reception elements and the amplifier are located on a same plane, the amplifier is electrically connected to the light emission or reception elements through a plurality of first wires, and the amplifier is electrically connected to the circuit board; and
    a fiber joint matched and coupled to the photoelectric signal module, where the fiber joint has a second coupling face facing the first coupling face, the fiber joint comprises a plurality of fibers, each having a front end exposed from the second coupling face, and the front ends of the fibers are axially aligned with the light emission or reception elements, respectively.

2. The photoelectric signal conversion and transmission device according to claim 1, wherein the amplifier is electrically connected to a plurality of signal terminals of the circuit board through a plurality of second wires.

3. The photoelectric signal conversion and transmission device according to claim 1, wherein the amplifier is disposed vertically between the circuit board and the light emission or reception elements; the connection base has two sockets disposed on the first coupling face respectively on two lateral sides of the light emission or reception elements; correspondingly, the fiber joint has two plugs on the second coupling face respectively on two lateral sides of the fibers; and, when the fiber joint and the photoelectric signal module are coupled, the plugs are plugged into the sockets so that the light emission or reception elements on the first coupling face are axially aligned with the front ends of the fibers on the second coupling face.

4. The photoelectric signal conversion and transmission device according to claim 1, further comprising a positioning base disposed on the circuit board adjacent to the second end, wherein the positioning base has a third coupling face adjacent to the second end and parallel to the first coupling face; the third coupling face has an opening, and the connection base is configured on the circuit board and embedded in the positioning base through the opening so that the connection base and positioning base are integrated together; the positioning base has two sockets disposed on the third coupling face respectively on two lateral sides of the recess; correspondingly, the fiber joint has two plugs on the second coupling face respectively on two lateral sides of the fibers; and, when the fiber joint and the photoelectric signal module are coupled, the plugs are plugged into the sockets so that the light emission or reception elements on the first coupling face are axially aligned with the front ends of the fibers on the second coupling face.

5. The photoelectric signal conversion and transmission device according to claim 1, wherein the connection base and the circuit board are integrally formed; a connector element is configured on the first coupling face of the connection base; a plurality of transmission paths are sealed inside the connection base and extended from the connector element; the transmission paths establish electrical connection with the circuit board so that the amplifier electrically connected to the connector element is also electrically connected to the circuit board.

6. The photoelectric signal conversion and transmission device according to claim 5, wherein the connection base has two sockets disposed on the first coupling face respectively on two lateral sides of the light emission or reception elements; correspondingly, the fiber joint has two plugs on the second coupling face respectively on two lateral sides of the fibers; and, when the fiber joint and the photoelectric signal module are coupled, the plugs are plugged into the sockets so that the light emission or reception elements on the first coupling face are axially aligned with the front ends of the fibers on the second coupling face.

7. The photoelectric signal conversion and transmission device according to claim 1, wherein the amplifier is a driver chip or a transimpedance amplifier (TIA); and the driver chip is a laser diode (LD) driver chip or a light emitting diode (LED) driver chip.

8. A photoelectric signal conversion and transmission device, comprising:
   a photoelectric signal module comprising;
      a circuit board having a first end and a second end opposite to the first end, where the first end is for electrical connection to an external multimedia device,
      a connection base disposed on the circuit board adjacent to the second end, where the connection base has a first coupling face adjacent to the second end and a top face on a top side of the connection base;
      a plurality of light emission or reception elements disposed on the first coupling face of the connection base,
      an amplifier disposed on the top face of the connection base adjacent to the circuit board, the amplifier is also positioned between the circuit board and the light emission or reception elements, a plurality of first wires electrically connect the amplifier to the light emission or reception elements, and a plurality of second wires electrically connect the amplifier to the circuit board;
   a fiber joint matched and coupled to the photoelectric signal module, where the fiber joint has a second coupling face facing the first coupling face, the fiber joint comprises a plurality of fibers, each having a front end exposed from the second coupling face, and the front ends of the fibers are axially aligned with the light emission or reception elements, respectively;
   a positioning base disposed on the circuit board adjacent to the second end, wherein the positioning base has a third coupling face adjacent to the second end and parallel to the first coupling face, the positioning base has a recess extended backward from the third coupling face towards the first end of the circuit board, the positioning base's third coupling face and recess are extended forward out of the circuit board's second end, and the connection base is disposed in the positioning base's recess.

9. The photoelectric signal conversion and transmission device according to claim 8, wherein the first wires go through a 90-detree turn to connect the light emission or reception elements; and the second wires are connected to a plurality of signal terminals of the circuit board.

10. The photoelectric signal conversion and transmission device according to claim 8, wherein the positioning base has two sockets disposed on the third coupling face respectively on two lateral sides of the recess; correspondingly, the fiber joint has two plugs on the second coupling face respectively on two lateral sides of the fibers; and, when the fiber joint and the photoelectric signal module are coupled, the plugs are plugged into the sockets so that the light emission or reception elements on the first coupling face are axially aligned with the front ends of the fibers on the second coupling face.

11. The photoelectric signal conversion and transmission device according to claim 8, wherein the amplifier is a driver chip or a transimpedance amplifier (TIA); and the driver chip is a laser diode (LD) driver chip or a light emitting diode (LED) driver chip.

* * * * *